(12) United States Patent
Xydis

(10) Patent No.: US 6,745,042 B1
(45) Date of Patent: Jun. 1, 2004

(54) SYNCHRONIZATION OF WIRELESS COMMUNICATION BETWEEN DEVICES

(75) Inventor: Thomas D. Xydis, Ann Arbor, MI (US)

(73) Assignee: Ensure Technologies, Inc., Ann Arbor, MI (US)

( * ) Notice: Subject to any disclaimer, the term of this patent is extended or adjusted under 35 U.S.C. 154(b) by 489 days.

(21) Appl. No.: 09/681,577

(22) Filed: May 2, 2001

(51) Int. Cl.$^7$ .................................................. H04B 7/01
(52) U.S. Cl. ........................ 455/502; 455/410; 455/42; 375/132; 370/304
(58) Field of Search ................................ 455/410, 411, 455/42, 502, 205, 88; 375/130, 132–137, 260, 261, 268, 271, 357, 358; 370/304, 302, 324, 343, 350, 431

(56) References Cited

U.S. PATENT DOCUMENTS

| | | | |
|---|---|---|---|
| 4,630,282 A | 12/1986 | Landers et al. | ................. 375/1 |
| 4,888,787 A | 12/1989 | Kisak | ............................. 375/1 |
| 4,956,644 A | 9/1990 | Leahy et al. | ................. 342/351 |
| 5,339,331 A | 8/1994 | Beauchamp et al. | ........... 375/1 |
| 5,422,952 A * | 6/1995 | Kennedy et al. | ............... 455/78 |
| 5,862,172 A | 1/1999 | Sugita et al. | ................. 375/208 |
| 5,923,701 A | 7/1999 | Nakamura | .................. 375/200 |
| 5,995,538 A | 11/1999 | Lomp | .......................... 375/208 |
| 6,023,241 A | 2/2000 | Clapper | ................. 342/357.13 |
| 6,055,264 A | 4/2000 | Kenney et al. | ............. 375/150 |
| 6,130,905 A | 10/2000 | Wakayama | .................. 375/132 |
| 6,173,004 B1 | 1/2001 | Ohashi | ........................ 375/132 |
| 6,188,715 B1 | 2/2001 | Partyka | ....................... 375/134 |
| 2002/0028680 A1 * | 3/2002 | Jenkins et al. | ............... 455/454 |
| 2004/0009749 A1 * | 1/2004 | Arazi et al. | ................. 455/41.2 |

OTHER PUBLICATIONS

IEEE STD 802 Nov. 1997, Part 11: Wireless LAN Medium Access Control (MAC) and Physical Layer (PHY) Specifications.

* cited by examiner

*Primary Examiner*—Vivian Chin
*Assistant Examiner*—Minh D. Dao
(74) *Attorney, Agent, or Firm*—Howard & Howard

(57) ABSTRACT

A method of synchronizing wireless communication between computer (16) having a transmitter (24) and a peripheral device (50) having an amplitude modulated (AM) receiver (54) and at least one frequency modulated (FM) receiver (56) which communicates via radio frequency signals. The computer (16) partitions the data (28) into a plurality of data blocks (30), spreads the data blocks (30) over a plurality of frequency channels (38) within a predetermined range (70), and selects one of the channels (32) for transmitting the signal (40). The resulting signal (40) has increased and decreased frequency corresponding to the data block (30). The peripheral device (50) detects the signal (40) as being present and begins measuring a time period (64) with the AM receiver (54). The method is characterized by scanning the plurality of frequency channels (38) with the FM receiver (56) during the measured time period (64). Additionally, the FM receiver (56) produces an output voltage (66) indicative of the radio frequency channel (32) in response to detecting the signal (40). The peripheral device (50) utilizes the output voltage (66) to select a narrow range of frequency channels (74) during the time period (64) to detect the signal (40) from the computer (16).

5 Claims, 3 Drawing Sheets ated recipients will intercept the data, therefore creating a secure transmission. Other transmitters described in the prior art do not incorporate frequency hopping information as part of the signal, but requires the receiver to learn the hopping pattern by tracking the hops of the transmission and synchronizing during each hop. Both devices must devices must then spend a undetermined amount of time to synchronize.

SYNCHRONIZATION OF WIRELESS COMMUNICATION BETWEEN DEVICES

BACKGROUND OF INVENTION

1. Field of the Invention

A method of synchronizing wireless communication between a first electronic device and a second electronic device utilizing frequency hopping spread spectrum communication systems.

2. Description of the Prior Art

Frequency hopping spread spectrum communication systems frequently include a first electronic device, such as a computer, having a transmitter and a second electronic device, such as a PDA, laptop, or printer, having a receiver. The first electronic device partitions data into a plurality of data blocks and spreads the transmission of the data blocks over a plurality of frequency channels. Each of the plurality of data blocks is modulated into a distinct and separate signal. The transmitter transmits the signal at the radio frequency channel for a predetermined time, or dwell time. A portion of the dwell time contains frequency hop information about the next frequency channel to which the transmitter will be transmitting on. The transmitter selects the radio frequency channels in a predetermined pseudo-random pattern. By transmitting the data in blocks and at random radio frequency channels, there is little chance that any unintended recipients will intercept the data, therefore creating a secure transmission. Other transmitters described in the prior art do not incorporate frequency hopping information as part of the signal, but requires the receiver to learn the hopping pattern by tracking the hops of the transmission and synchronizing during each hop. Both devices must devices must then spend a undetermined amount of time to synchronize.

The prior art receivers monitor the plurality of radio frequency channels for the transmittance of any signals being transmitted on those channels. The receiver detects the signal and demodulates the data block and receives the hopping information. The receiver then selects the next radio frequency channel to monitor for a signal. However, these receivers do not know when the transmitter is going to transmit the signal or at which of the plurality of radio frequency channels the transmitter will transmit on. Hence, the receivers are required to maintain a powered-on state for detection of the signal. Additionally, the synchronization of the receiver is very slow when it monitors the entire range of frequency channels.

Accordingly, it would be advantageous to provide a system wherein the transmitter and the receiver were able to synchronize rapidly thereby decreasing the synchronization time and without compromising the security of the transmission.

SUMMARY OF INVENTION

The subject invention provides a method of synchronizing wireless communication between a first electronic device having a transmitter and a second electronic device having an amplitude modulated (AM) receiver and at least one frequency modulated (FM) receiver which communicates via frequency hopping spread spectrum signals. The first step of the method is partitioning data stored within the first electronic device into a plurality of data blocks for transmittance of the data blocks over wireless connections to the second electronic device. Then the data blocks are spread over a plurality of frequency channels such that each of the data blocks is transmitted on a different frequency channel for creating a secure transmission link between the first electronic device and the second electronic device. The data block is modulated at a radio frequency channel to establish a signal having amplitude modulated (AM) characteristics and the signal is transmitted at the radio frequency channel to establish a connection between the first electronic device and the second electronic device. The method further includes the step of detecting the AM characteristics of the signal with the AM receiver and measuring a time period beginning at the detection of the signal by the AM receiver and ending when the signal is no longer detected for decreasing the synchronization time between the first electronic device and the second electronic device. The method is characterized by scanning the plurality of frequency channels with a frequency modulated (FM) receiver during the measured time period such that the second electronic device knows when the first electronic device is transmitting the signal.

The method allows for the FM receiver to more rapidly synchronize with the transmitter which allows for faster data transmission. In our work environments, many devices will be communicating via radio frequencies and the need for rapid transmission of data to free up other frequency channels will be extremely important for wireless communication to be effective. Additionally, only the AM receiver must remain in a powered-on state while scanning the frequency channels which reduces the power consumption.

BRIEF DESCRIPTION OF DRAWINGS

Other advantages of the present invention will be readily appreciated as the same becomes better understood by reference to the following detailed description when considered in connection with the accompanying drawings wherein.

DETAILED DESCRIPTION

Figure 1:
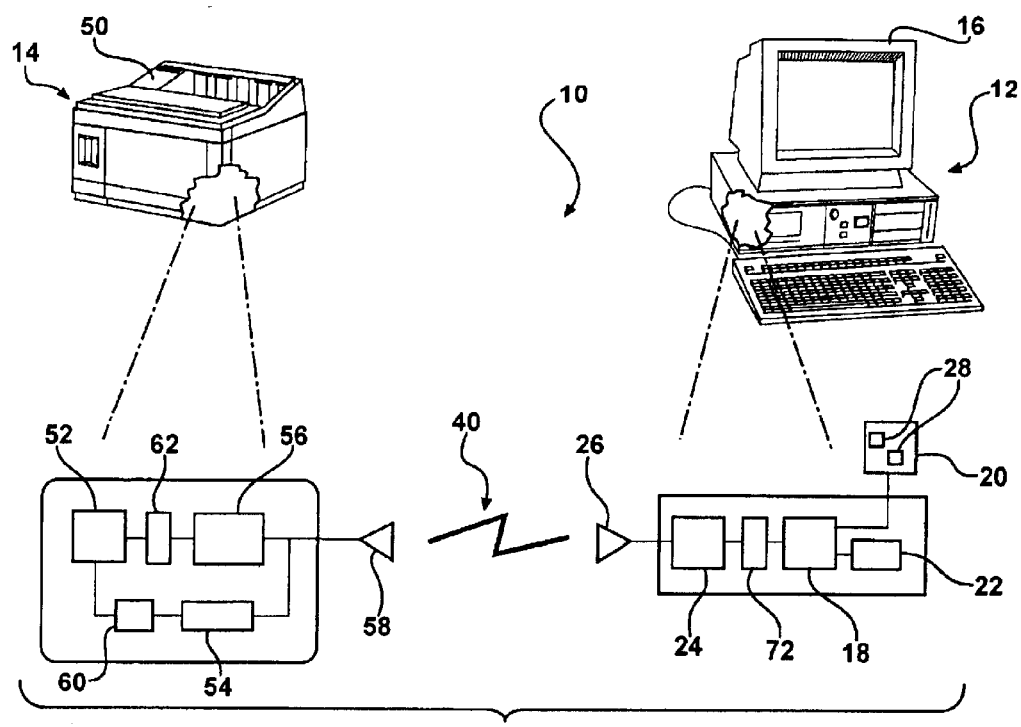
FIG. 1 is a perspective view of a first electronic device having a transmitter transmitting a signal to a second electronic device having an amplitude modulated (AM) receiver and a frequency modulated (FM) receiver.

Referring to the Figures, wherein like numerals indicate like or corresponding parts throughout the several views, a communication system is generally shown at 10 in FIG. 1. The system 70 is designed to perform a method of synchronizing wireless communication between a first electronic device 12 and a second electronic device 14. Both devices 12, 14 must spend valuable time synchronizing to communicate, therefore the subject invention decreases the synchronization time.

Figure 3:
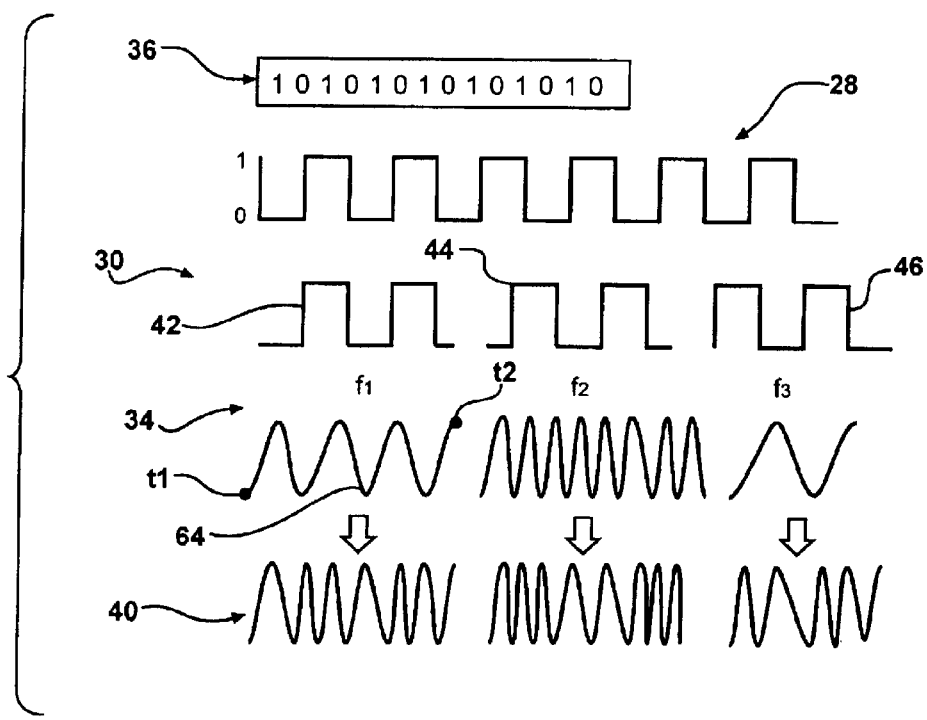
FIG. 3 is a schematic view of the transmitter preparing data to be transmitted via frequency hopped spread spectrum signals.
Figure 4:
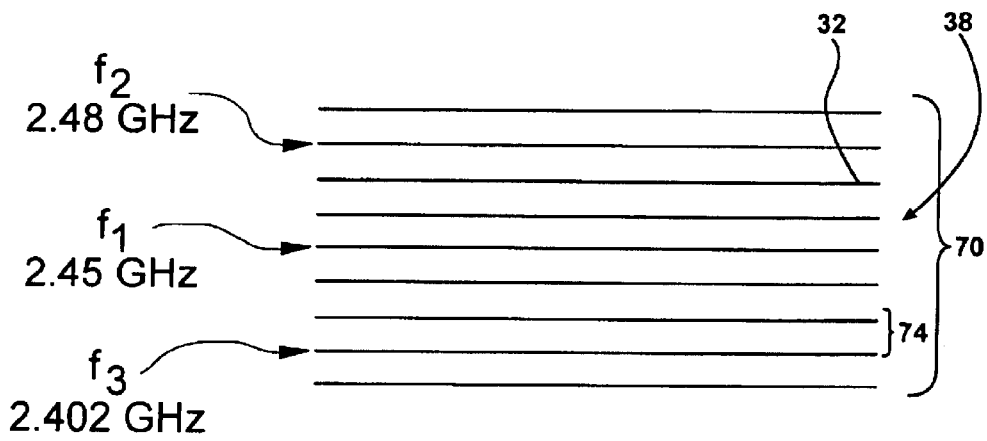
FIG. 4 is a schematic view of the spreading of the data blocks over a plurality of frequency channels.
Figure 5:
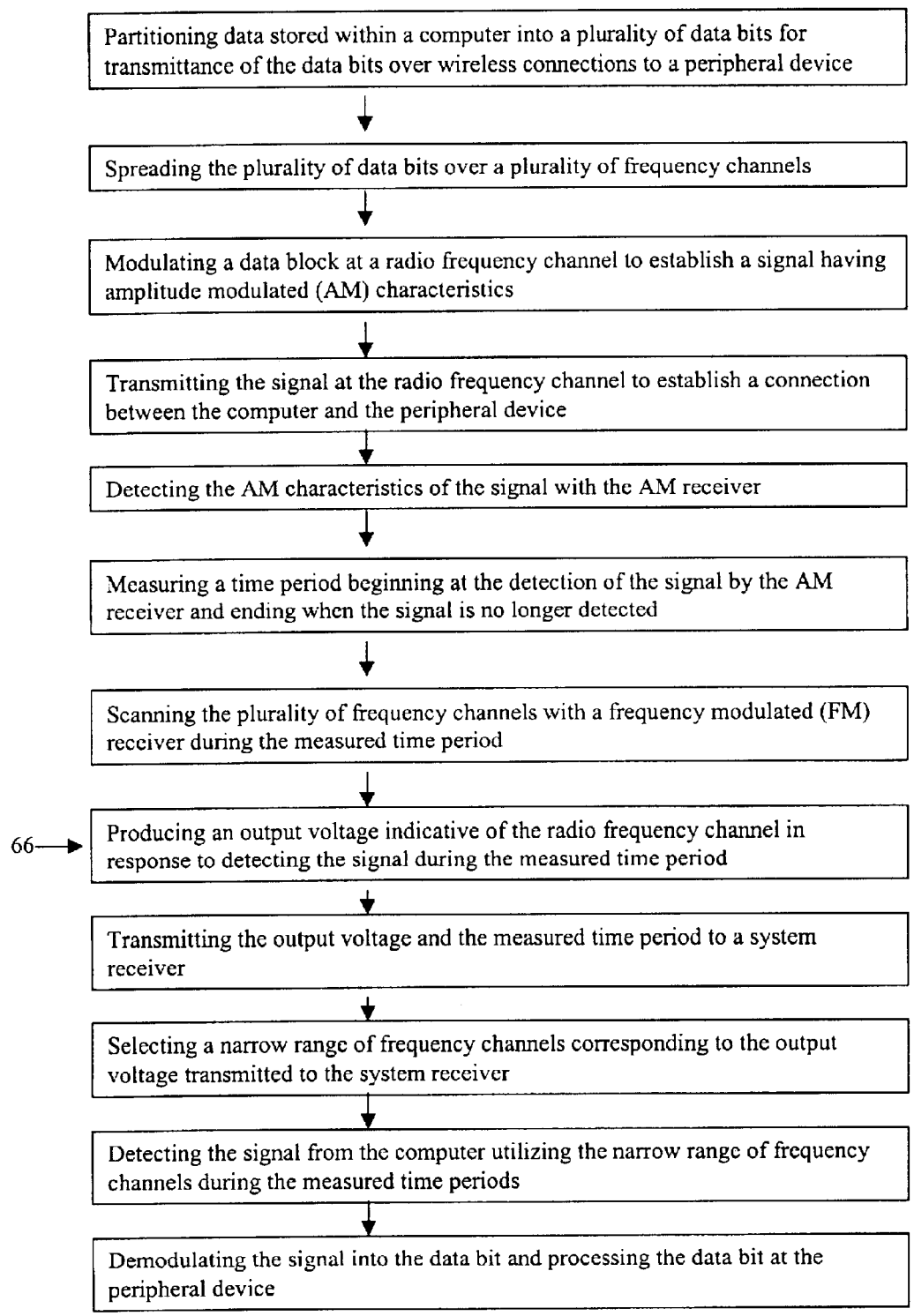
FIG. 5 is a flowchart depicting a method of synchronizing communication between the first electronic device and the second electronic device.

The first electronic device 12 is illustrated as a computer 16. It should be appreciated that the first electronic device 12 includes any device capable of performing the method as described below. The computer 16 comprises a first processor 18 connected to a data storage 20, an oscillator 22, a modulator 72 and a transmitter 24 having a first antenna 26. The computer 16 sends data 28 stored within the data storage 20 to the processor. The first processor 18 partitions the data 28 into a plurality of data blocks 30, as shown in FIG. 3, and selects a radio frequency channel 32 from the oscillator 22 to produce a radio frequency (RF) carrier signal 34. Each of the data blocks 30 comprises a series of binary codes 36 which are represented by ones and zeros. Each one and zero corresponds to a data bit and a data block 30 comprises multiple data bits. The oscillator 22 is able to produce the RF carrier signal 34 having any frequency requested by the first processor 18 as shown in FIG. 5. Typically, a range 70, shown in FIG. 4, for frequency hopping is predetermined and programmed into the first processor 18 with each hop corresponding to an individual frequency channel 32. Referring to FIG. 4, the oscillator 22 produces the carrier signal 34 having a first frequency $f1$, then changes to a second frequency $f2$, and then a third frequency $f3$.

The first processor 18 also spreads the data blocks 30 over a plurality of frequency channels 38 within the predetermined range 70, illustrated in FIG. 4, in a pseudo-random manner. In the preferred embodiment, the predetermined range 70 has an upper limit of 2.48 GHz and a lower limit of 2.402 GHz. The predetermined range 70 is divided into seventy-nine 1 MHz channels between the upper and lower limit, where each of the channels is used for transmitting the data. The data block 30 and the carrier signal 34 are then combined in the modulator 72 and the result is a signal 40 for transmittance through the first antenna 26 at the selected frequency to the second electronic device 14. FIG. 3 further shows a first data block 42 being combined with the carrier signal 34 at the first frequency $f1$, a second data block 44 being combined at the second frequency $f2$, and a third data block 46 being combined with the third frequency $f3$. The resulting signals formed from the combinations have an increased frequency when the binary number of the data block 30 is a one. The binary number of zero produces a portion 48 of the signal having a slower frequency. By transmitting the data blocks 30 at pseudo-random frequency channels 38, it prevents the data 28 from being intercepted by an unintended recipient.

The second electronic device 14 is illustrated as a peripheral device 50, such as a printer, a mouse, or a PDA. It should be appreciated that the second electronic device 14 may be any device capable of performing the method as described below. The peripheral device 50 comprises a second processor 52 connected to an amplitude modulated (AM) receiver 54, at least one frequency modulated (FM) receiver 56, a second antenna 58, a counter 60, and a demodulator 62. The AM receiver 54 scans the predetermined range 70 of frequency channels 38 for the detection of any transmitted signal. The signal 40 transmitted by the computer 16 is a FM signal as discussed above, but the AM receiver 54 is able to detect any amplitude which appears within the predetermined range 70. The output from the AM receiver 54 is a signal having constant amplitude, but the AM receiver 54 can not obtain any of the data 28. When the AM receiver 54 detects the signal 40 as being present, at t1 in FIG. 3, the counter 60 begins measuring a time period 64 for which the signal 40 is present. The time period 64 ends, shown at t2 in FIG. 3, when the AM receiver 54 detects that the amplitude of the signal 40 has disappeared. The measured time period 64 is then transmitted to the second processor 52. The second processor 52 may then power-on the FM receiver 56 in response to detecting the signal 40 with the AM receiver 54. By only operating the AM receiver 54, there is less power consumption.

The method is characterized by scanning the plurality of frequency channels 38 with the FM receiver 56 during the measured time period 64 such that the second electronic device 14 knows when the computer 16 is transmitting the signal 40. The processor utilizes the time period 64 to initialize the FM receiver 56 to scan for the signal 40. The FM receiver 56 is preferably a broadband receiver such that the FM receiver 56 is monitoring the entire plurality of frequency channels 38 and unable to demodulate the signal 40. Alternately, the FM receiver 56 could be a narrow band receiver such that the FM receiver 56 detects the signal 40 and demodulates the data 28. This narrow band FM receiver 56 could have a channel measurement mode and a data recovery mode.

In the preferred embodiment, the FM receiver 56 is only able to provide an estimate of the frequency channel 32 and therefore not able to demodulate the signal 40. For example, the FM receiver 56 may have divided the entire range of frequency channels 38 into four sections. The FM receiver 56 detects the signal 40 can make an estmate of the channel on which the signal is found, but is not able to determine the exact frequency changes of the signal, i.e the FM receiver 56 cannot demodulate the signal 40 sufficiently to recover the data block. Therefore, the FM receiver 56 produces an output voltage 66, shown in FIG. 5, indicative of the radio frequency channel 38 in response to detecting the signal 40 during the measured time period 64. In the preferred embodiment, it is advantageous to produce the output voltage 66, however, it is foreseeable to generate other output signals which would accomplish the same result as the output voltage 66. The output voltage 66 corresponds to the four sections. For instance, if the output voltage 66 is 5 volts, the output voltage 66 corresponds to the upper most section of the frequency channels 38 that are being scanned by the FM receiver 56. If the output voltage 66 was 0 volts, the signal is being transmitted in the lowest section of frequency channels 38. The FM receiver 56 transmits the output voltage 66 to the second processor 52.

Figure 2:
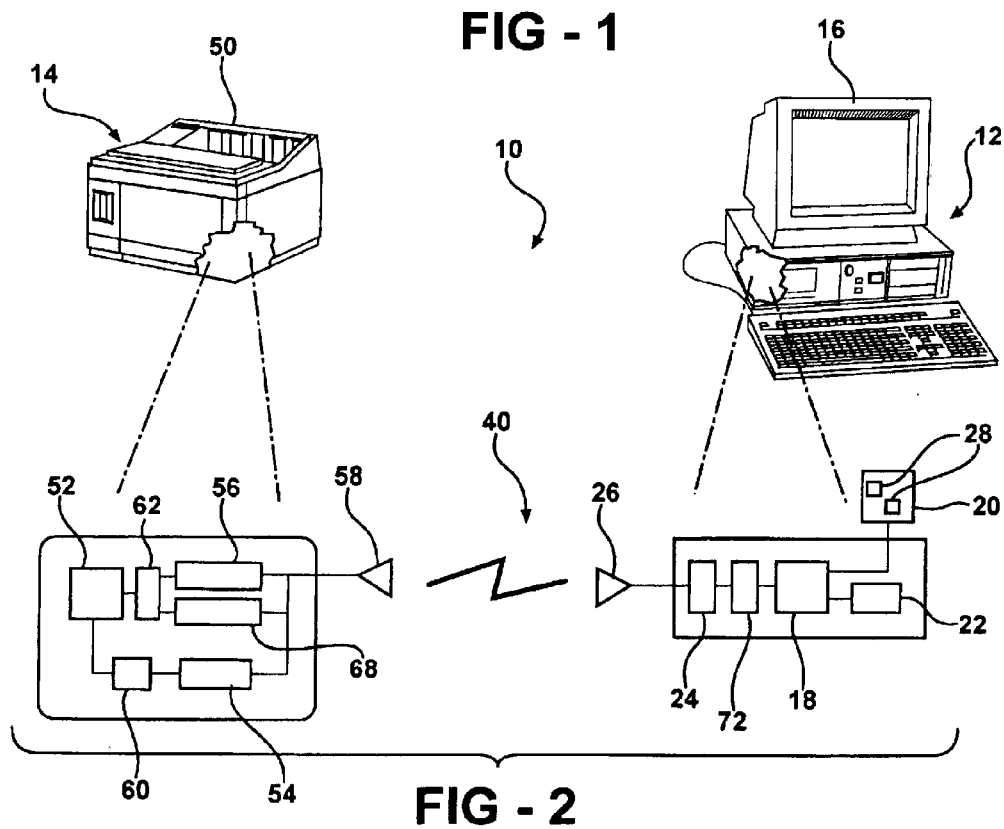
FIG. 2 is a perspective view of the first electronic device having a transmitter transmitting a signal to the second electronic device having an AM receiver, a FM receiver, and a system receiver.

The second processor 52 utilizes the output voltage 66 to select a narrow range of frequency channels 74 with a system receiver 68, shown in FIG. 2, which preferably is a narrow band receiver. The narrow range of frequency channels 74 may include a single frequency channel so long as the system receiver 68 is so configured. The narrow band receiver is able to detect very small changes in frequency of the signal which represents the binary numbers 36 of the data block 30. The second processor 52 initializes the system receiver 68 to scan the narrow range of frequency channels 74, shown in FIG. 4, during the time period 64 to detect the signal from the computer 16. The system receiver 68 knows which of the sections to anticipate the signal transmission and during the time periods 64 which the transmission will occur. Therefore, the system receiver 68 scans those frequency channels 74 in the specified section and is able to detect minute variations in the frequency of the signal 40.

The system receiver 68 transmits the change in frequency to the demodulator 62 and the demodulator 62 is able to extract the binary numbers 36 from the signal 40. The binary numbers 36 are then processed by the second processor 52 to produce data block 30 as it was originally transmitted and the second electronic device 14 responds to the data 28 transmitted by the first electronic device 12.

Obviously, many modifications and variations of the present invention are possible in light of the above teachings. The invention may be practiced otherwise than as specifically described within the scope of the appended claims, wherein that which is prior art is antecedent to the novelty set forth in the characterized by clause. The novelty is meant to be particularly and distinctly recited in the characterized by clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A method of synchronizing wireless communication between a first electronic device (12) having a transmitter (24) and a second electronic device (14) having an amplitude modulated (AM) receiver (54) and at least one frequency modulated (FM) receiver (56) which communicates via radio frequency signals, said method comprising the steps of;

partitioning data (28) stored within the first electronic device (12) into a plurality of data blocks (30) for transmittance of the data blocks (30) over wireless connections to the second electronic device (14), spreading the plurality of data blocks (30) over a plurality of frequency channels (38) such that each of the data blocks (30) is transmitted on a different frequency channel for secure transmission between the first electronic device (12) and the second electronic device (14), modulating a data block (30) at a radio frequency channel (32) to establish a signal (40) having amplitude modulated (AM) characteristics, transmitting the signal (40) at the radio frequency channel (32) to establish a connection between the first electronic device (12) and the second electronic device (14), detecting the AM characteristics of the signal (40) with the AM receiver (54), measuring a time period (64) beginning at the detection of the signal (40) by the AM receiver (54) and ending when the signal (40) is no longer detected for decreasing the synchronization time between the first electronic device (12) and the second electronic device (14), said method characterized by scanning the plurality of frequency channels (38) with a frequency modulated (FM) receiver (56) during the measured time period (64) such that the second electronic device (14) knows when the first electronic device (12) is transmitting the signal (40).

2. A method as set forth in claim 1 further characterized by producing an output voltage (66) indicative of the radio frequency channel (32) in response to detecting the signal (40) during the measured time period (64) and transmitting the output voltage (66) and the measured time period (64) to a system receiver (68) such that the system receiver (68) knows when the first electronic device (12) is transmitting the signal (40) and an estimated frequency channel (32) for detecting the signal (40).

3. A method as set forth in claim 2 further characterized by selecting a narrow range of frequency channels (74) corresponding to the output voltage (66) transmitted to the system receiver (68) for increased synchronization between the system receiver (68) and the transmission of the data blocks (30).

4. A method as set forth in claim 3 further characterized by detecting the signal (40) from the first electronic device (12) utilizing the narrow range of frequency channels (74) during the measured time periods (64) and demodulating the signal (40) into the data block (30) and processing the data block (30) at the second electronic device (14).

5. A method of synchronizing wireless communication between a computer (16) having a transmitter (24) and a peripheral device (50) having an amplitude modulated (AM) receiver (54) and at least one frequency modulated (FM) receiver (56) which communicates via radio frequency signals, said method comprising the steps of;

partitioning data stored within the computer (16) into a plurality of data blocks (30) for transmittance of the data blocks (30) over wireless connections to the peripheral device (50), spreading the plurality of data blocks (30) over a plurality of frequency channels (38) such that each of the data blocks (30) is transmitted on a different frequency channel (32) for secure transmission between the computer (16) and the peripheral device (50), modulating a data block (30) at a radio frequency channel (32) to establish a signal (40) having amplitude modulated (AM) characteristics, transmitting the signal (40) at the radio frequency channel (32) to establish a connection between the computer (16) and the peripheral device (50), detecting the AM characteristics of the signal (40) with the AM receiver (54), measuring a time period (64) beginning at the detection of the signal (40) by the AM receiver (54) and ending when the signal (40) is no longer detected for decreasing a synchronization time between the computer (16) and the peripheral device (50), scanning the plurality of frequency channels (32) with a frequency modulated (FM) receiver (56) during the measured time period (64) such that the peripheral device (50) knows when the computer (16) is transmitting the signal (40), producing an output voltage (66) indicative of the radio frequency channel (32) in response to detecting the signal (40) during the measured time period (64), transmitting the output voltage (66) and the measured time period (64) to a system receiver (68) such that the system receiver (68) knows when the computer (16) is transmitting the signal (40) and an estimated frequency channel (32) for detecting the signal (40), selecting a narrow range of frequency channels (74) corresponding to the output voltage (66) transmitted to the system receiver (68) for increased synchronization between the system receiver (68) and the transmission of the data blocks (30), detecting the signal (40) from the computer (16) utilizing the narrow range of frequency channels (74) during the measured time periods (64), and demodulating the signal (40) into the data block (30) and processing the data block (30) at the peripheral device (50).

\* \* \* \* \*